(12) United States Patent
Teusch

(10) Patent No.: US 11,491,558 B2
(45) Date of Patent: Nov. 8, 2022

(54) ROUGHING TOOL AND METHOD FOR ITS MANUFACTURE

(71) Applicant: GUEHRING KG, Albstadt (DE)

(72) Inventor: Bruno Teusch, Esslingen (DE)

(73) Assignee: Guehring KG, Albstadt (DE)

( * ) Notice: Subject to any disclaimer, the term of this patent is extended or adjusted under 35 U.S.C. 154(b) by 185 days.

(21) Appl. No.: 16/815,530

(22) Filed: Mar. 11, 2020

(65) Prior Publication Data
US 2020/0282477 A1    Sep. 10, 2020

Related U.S. Application Data

(63) Continuation of application No. PCT/EP2018/073693, filed on Sep. 4, 2018.

(30) Foreign Application Priority Data

Sep. 14, 2017   (DE) .................. 10 2017 121 354.6

(51) Int. Cl.
  *B23C 5/04*   (2006.01)
  *B23C 5/18*   (2006.01)
  *B23P 15/34*  (2006.01)

(52) U.S. Cl.
  CPC .............. *B23C 5/04* (2013.01); *B23C 5/18* (2013.01); *B23P 15/34* (2013.01); *B23C 2210/241* (2013.01)

(58) Field of Classification Search
  CPC ....... B23C 5/04; B23C 5/18; B23C 2210/241; B23C 2210/242
  See application file for complete search history.

(56) References Cited

U.S. PATENT DOCUMENTS 1,432,580 A * 10/1922 Vauclain ................. B23C 5/006
                                                                144/237
3,293,988 A    12/1966 Stremple
(Continued)

FOREIGN PATENT DOCUMENTS

DE          28 19 697 C2    8/1979
DE   10 2006 008 031 B4    11/2007
(Continued)

OTHER PUBLICATIONS

International Search Report and Written Opinion of the International Searching Authority (and English Translation) from a corresponding International patent application (PCT/EP2018/073693) dated Nov. 28, 2018, 17 pages.
(Continued)

*Primary Examiner* — Omar Flores Sanchez
(74) *Attorney, Agent, or Firm* — Burr & Brown, PLLC

(57) ABSTRACT

The invention relates to a method for producing a roughing tool (1), particularly a circular milling tool, comprising the following steps: fitting a lateral surface of a tool base body (10) that can be rotatably driven about an axis of rotation (2) with a number of cutting element blanks (20') that are staggered in the axial and/or peripheral direction, such that a free edge of each cutting element blank (20') protrudes out of the lateral surface in the mounted state; inserting a microtoothing comprising a plurality of axially spaced cutting teeth (21) into the respective free edges of the cutting element blanks (20') by a material removal method, preferably by thermal machining, particularly preferably by eroding, in the premounted state on the tool base body (10). The invention further relates to a roughing tool produced by means of such a method.

11 Claims, 3 Drawing Sheets

(56) References Cited

U.S. PATENT DOCUMENTS

Figure 1:
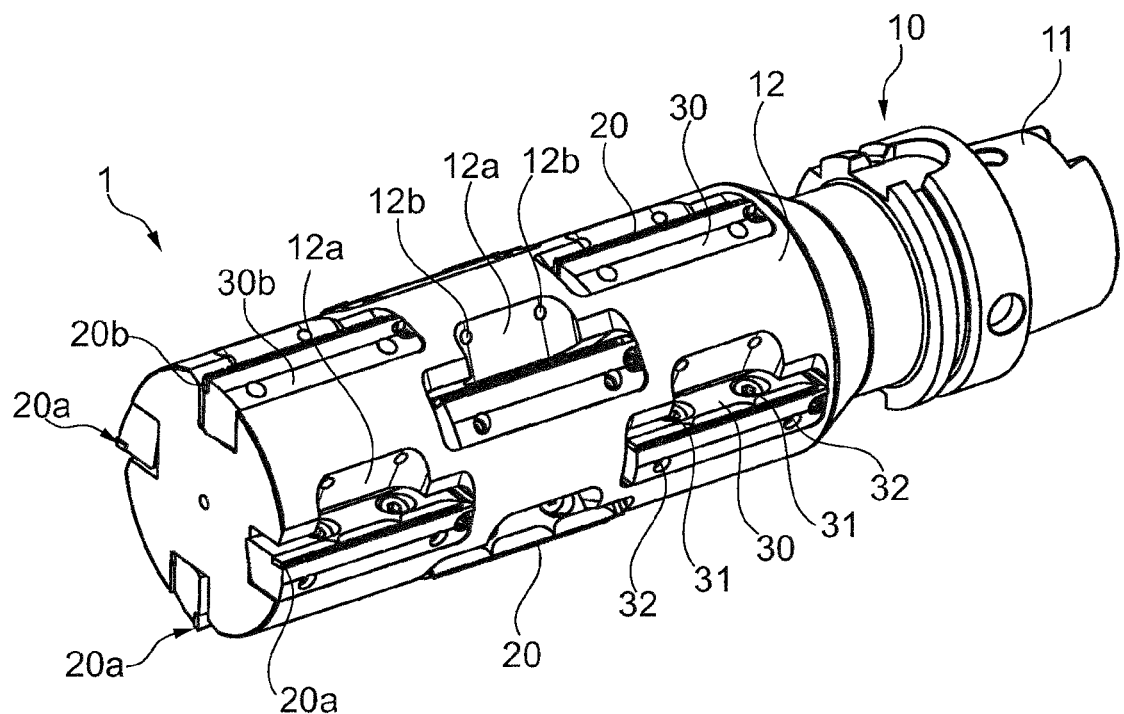

| | | | |
|---|---|---|---|
| 2003/0223830 A1 | 12/2003 | Bryan et al. | |
| 2010/0135740 A1* | 6/2010 | Harif | B23B 1/00 408/1 R |
| 2014/0291307 A1 | 10/2014 | Saegmueller et al. | |
| 2017/0120352 A1 | 5/2017 | Stephenson et al. | |
| 2019/0210119 A1* | 7/2019 | Teusch | B23C 5/04 |
| 2019/0232527 A1* | 8/2019 | Endres | B28D 1/186 |
| 2019/0299304 A1* | 10/2019 | Jia | B23C 5/18 |
| 2021/0245274 A1* | 8/2021 | Teusch | B23C 3/34 |

FOREIGN PATENT DOCUMENTS

| | | |
|---|---|---|
| DE | 10 2009 028 040 A1 | 2/2011 |
| DE | 10 2011 116 974 A1 | 5/2013 |
| JP | S60146620 A1 | 8/1985 |
| JP | 2006-088242 A1 | 4/2006 |

OTHER PUBLICATIONS

International Preliminary Report on Patentability from a corresponding patent application (PCT/EP2018/073693) dated Mar. 17, 2020, 7 pages.
DPMAregister from a corresponding German Patent Application (DE 10 2017 121 354.6) printed on Jun. 10, 2020, 2 pages.

* cited by examiner

ROUGHING TOOL AND METHOD FOR ITS MANUFACTURE

The invention relates to a method for manufacturing a roughing tool, in particular a circular milling tool, as well as to a roughing tool that was manufactured with such a manufacturing method.

It is sufficiently well known that tribologically highly stressed surfaces of bores in metal workpieces, e.g., the piston running surfaces of cylinder bores or cylinder liners in an internal combustion engine, are mechanically roughed with the help of non-cutting or cutting tools, so as to obtain a good adhesive base for a surface layer to be applied in particular via thermal spraying.

Two approaches known in prior art for roughing a cylinder bore in this way involve introducing micro-channels or micro-grooves with and without feeding. Tools for introducing micro-channels with feeding, e.g., of the kind known from DE 10 2009 028 040 A1, often only have a few cutting teeth or a short, micro-toothed cutting edge by comparison to the borehole depth, which generate(s) a threadlike structure under a slight feeding motion. In this way, the cutting teeth that generate the micro-channel structure engage into the same groove one after the other during the tool rotation superposed onto the feeding motion. Naturally, only slight feeding velocities are possible when proceeding in this way, which leads to relatively long production times. In order to solve this problem, non-feeding roughing tools were developed, which have a plurality of cutting edges staggered in the axial direction that added together form a cutting part of the tool whose axial length corresponds to the depth of the borehole to be roughed. As a consequence, such tools can machine the entire surface to be machined with a single cut. Given the lack of any feeding motion, such roughing tools must have a smaller diameter than the borehole to be roughed, so that they can be introduced into the latter. In order to nonetheless engage the cutting part of the roughing tool with the lateral bore surface, such shank tools are often conceived as circular milling tools, i.e., a rotation around a shank axis is superposed by a movement of the tool on a circular path.

One longstanding problem in the field of manufacturing the roughing tools described above is that building or assembling a roughing tool with a plurality of delicate cutting edges or cutting strips is time-consuming and demanding. In particular finely adjusting the axial and radial position of the individual cutting edges proves to be extremely complicated, since the individual cutting teeth must be precisely adjusted to within a few micrometers in both degrees of freedom to produce a high concentricity and high-quality micro-channel structure. In particular in non-feeding roughing tools, which are often fitted with twelve or more individual cutting edges, the fine adjustment can involve a considerable time expenditure, in part with an unsatisfactory result.

Therefore, the object of the present invention is to provide a roughing tool as well as a method for manufacturing such a roughing tool that is characterized by a comparatively high machining accuracy as well as ease of assembly and adjustment accuracy.

This object is achieved by a method for manufacturing a roughing tool with the features in claim 1. Advantageous further developments and embodiments are the subject of the dependent claims. In terms of the device, the aforementioned object is achieved by a roughing tool with the features in claim 10.

In the method according to the invention for manufacturing a roughing tool, a lateral surface of a tool base body that can be rotatably driven around an axis of rotation is fitted with at least one cutting element blank in such a way that a free edge of the cutting element blank protrudes out of the lateral surface in the mounted state. For example, the cutting element blank can be designed as a cutting plate, cutting strip, cutting insert or comparable cutting body, and is characterized in that its free edge (the subsequent cutting edge) does not yet have the final desired cutting profile (e.g., is present as a straight edge or geometrically undefined edge). In a subsequent step, a thermally machining process introduces a microtoothing (a cutting profile) with a plurality of axially spaced cutting teeth into the free edge of the cutting element blank premounted on the tool base body. According to the invention, at the same time the microtoothing (the cutting profile) is introduced via machining, the individual cutting teeth are brought to an exact measure of a respective nominal diameter. It could also be said that cutting teeth are carved out of the free edges of the premounted cutting element blanks in a thermal machining process, and at the same time finely adjusted to a desired cutting circle diameter.

As opposed to conventional manufacturing processes, in which the cutting elements are already assembled to the tool base body with the final cutting profile, and must be finely adjusted during assembly by modifying the cutting element position, it is sufficient in the method according to the invention to coarsely preadjust the cutting element blanks. During the subsequent ablative fine adjustment, the individual cutting teeth of the microtoothing can be brought to the nominal diameter comparatively quickly and with a comparatively higher accuracy. The manufacturing method according to the invention thus enables a faster manufacture of a roughing tool at a concurrently higher concentricity.

The thermal machining method preferably involves (spark) erosion, which makes it possible to introduce complex geometries in the free edges of the cutting element blanks without contact and with a high accuracy.

In a preferred embodiment of the invention, the tool base body can be fitted with a plurality of cutting element blanks staggered in the axial and/or peripheral direction, with the microtoothing then being ablatively introduced into their free edges in a premounted state.

In another preferred aspect of the invention, fitting the tool base body can involve mounting at least a first and a second cutting element blank on the lateral surface of the tool base body so as to be flush in a peripheral direction and angularly spaced apart, and introducing the microtoothing can involve ablatively machining the first and second cutting element blank in such a way that the individual cutting teeth of the respective resulting cutting elements are arranged flush in the peripheral direction after machining. In other words, the (axial) length and/or axial position of the individual cutting teeth can also be finely adjusted at the same time that the microtoothing is being ablatively introduced. In other words, flush in the peripheral direction means that the cutting teeth of the cutting elements of a side milling cutter have the same cutting profiles, or travel the same flight circle/perform the same cut during a rotation of the roughing tool around the axis of rotation.

While introducing the microtoothing, each cutting tooth can preferably be fabricated as a rectangular profile defined by a prescribed length and height.

In order to achieve advantageous adhesive properties for the machined surface, the prescribed length can lie within a range of 200 μm to 400 μm, and the prescribed height lies within a range of 60 µm to 300 µm. In addition, the axial distance between the two sequential teeth can advantageously lie within a range of 100 µm to 1000 µm.

In order to obtain a surface quality that stays constant over the entire machining length of the cylindrical surface, and hence a constant adhesive base for a subsequent coating, the cutting teeth of the at least one cutting element are preferably arranged at essentially identical axial distances, i.e., with the identical axial pitch, and provided with identical tooth profiles. Identically configured cutting elements help make it easy to manufacture the cutting elements or cutting strips, thereby simplifying roughing tool assembly and keeping manufacturing costs low.

In another preferred aspect of the invention, a preceding manufacturing step while manufacturing the tool base body can involve introducing a number of recesses staggered in an axial and/or peripheral direction into the lateral surface of the tool base body, which are subsequently fitted with the cutting element blanks. In another manufacturing step, retaining devices can further preferably be fixed in the recesses for detachably receiving and retaining the cutting element blanks. The advantage to detachably retaining cutting elements is that the tool can be easily fitted with new cutting edges, e.g., given wear or if the tool is to be provided with a new, different toothing profile.

The retaining devices can especially preferably be axially and/or radially adjustable in design. The retaining devices can especially preferably be designed as adjustable cassettes for detachably receiving and retaining the cutting elements. The entire cassette with the cutting edge retained therein can here preferably be axially and/or radially adjusted. However, embodiments are likewise envisaged in which the cutting edge can be adjusted in its relative position inside of the cassette, for example by means of adjusting screws. Likewise, adjustable clamping jaws or the like can alternatively also be used as the retaining devices instead of cassettes.

In such an embodiment with axially and/or radially adjustable cassettes, the process of fitting the tool base body can involve mounting at least one cutting element blank in the cassette, and then axially and radially preadjusting it. The at least one cutting element blank is thus advantageously preadjusted before the fine adjustment that takes place while introducing the toothing. The advantage to this is that less material must be removed for introducing the microtoothing in the case of preadjusted cutting element blanks (or pre-aligned free edges thereof). This decreases material consumption on the one hand, and accelerates manufacture on the other.

In a preferred embodiment of the invention, a predetermined staggering in the axial direction, preferably of between 100 µm and 1000 µm, can be introduced between two respectively sequential cutting elements in the peripheral direction while or after introducing the microtoothing into the cutting elements. While introducing the microtoothing, the first cutting element blank and a third cutting element blank that follows the first cutting element blank in the peripheral direction can preferably be ablatively machined in such a way that their microtoothing profiles are essentially congruent. In this type of case, the cassettes can be used to subsequently adjust the (axial) staggering between the sequential cutting elements in the peripheral direction. A slight staggering between the sequential cutting elements in the peripheral direction makes it possible to decrease the load placed on the individual cutting elements, since each element now only has to cut a portion of the micro-channel structure out of the surface to be machined.

In an especially preferred embodiment, the (axial) staggering between sequential cutting elements in the peripheral direction can be selected in such a way that the cutting teeth of the third cutting element are each arranged, in particular centrally, between two cutting teeth of the first cutting element as viewed in the axial direction. Of course, the axial distance selected between the cutting teeth must for this purpose be larger than the axial length of the individual cutting teeth. Such a layout of axial staggering and cutting profiles in the peripheral direction of sequential cutting elements has an advantageous effect on the vibrational properties of the tool in the machining process, and decreases the load placed on the individual cutting elements.

In another preferred aspect of the invention, while fitting the tool base body, the cutting element blanks can be arranged in at least two groups that are adjacent in an axial direction, each comprised of respective cutting element blanks that are sequential in a peripheral direction and spaced apart at equidistant angles (and essentially lying at one height in the axial direction). Especially preferably provided are three axially adjacent quartets comprised of cutting elements spaced apart at 90° angles in the peripheral direction.

It is advantageous that groups of cutting element blanks that are adjacent in an axial direction each be arranged staggered relative to each other by a predetermined angle, in particular by 45°, so as to stagger the times at which the cutting elements of the individual groups engage.

The cutting element blanks can advantageously be fabricated out of an extremely hard cutting material, preferably a hard metal (HM), polycrystalline diamond (PKD) or cubic boron nitride (CBN). The cutting element blanks can especially preferably be fabricated out of PKD via casting, especially sintering.

In another preferred exemplary embodiment, the tool base body can be fabricated out of a steel in a preceding production step. While fabricating the tool base body, it is further advantageous that an interior cooling lubricant supply system be introduced for supplying the cutting elements with cooling lubricant.

Another aspect of the present invention relates to a roughing tool, in particular to a circular milling tool, with a tool base body that can be rotatably driven around an axis of rotation and a number of cutting elements arranged in a lateral surface of the tool base body. According to the invention, in a state premounted on the tool base body, the cutting elements have a microtoothing with a plurality of axially spaced cutting teeth, which was introduced in a thermal machining process and brought to a predetermined nominal dimension. A roughing tool manufactured in this way is characterized by a concentricity that is virtually unachievable with other adjustment methods, i.e., the deviation between the individual cutting teeth and the nominal diameter of the tool is especially slight.

In a preferred embodiment, the tool base body can have a shank section that can be engaged with a corresponding machine tool, and have a receiving section on which the cutting elements are arranged. The receiving section fitted with the cutting elements can form a cutting part of the tool. The cutting part of the tool can preferably be configured so as to have an axial length greater than or equal to the borehole depth of the borehole to be machined. In this way, the tool can machine the entire surface to be roughed with a single cut.

In a preferred embodiment of the invention, a number of recesses staggered in the axial and/or peripheral direction can be introduced into the lateral surface of the tool base body, which are subsequently fitted with the cutting element blanks. Retaining devices for detachably receiving and retaining the cutting element blanks can further preferably be fixed in the recesses. The advantage to detachably retaining the cutting elements is that the tool can be easily fitted with new cutting edges, e.g., given wear or if the tool is to be provided with a new, different toothing profile.

The retaining devices can especially preferably be designed as axially and/or radially adjustable cutting edge holders/cassettes. Such adjustable cassettes can be used to preadjust the cutting elements as described above, and change them out in the event of wear.

The cutting elements can preferably be arranged in several axially staggered groups of cutting elements that are sequential in a peripheral direction and preferably spaced apart at equidistant angles.

In a preferred aspect of the invention, the axially adjacent groups of cutting elements that are sequential in the peripheral direction can be twisted/angularly spaced relative to each other. Aforesaid groups can further preferably partially overlap each other in an axial direction, preferably within a range of between 300 and 1000 μm, so as to form a continuous cutting profile over the entire cutting part of the tool.

In a preferred aspect of the invention, the cutting elements can be fabricated out of an extremely hard cutting material, preferably a hard metal (HM), polycrystalline diamond (PKD) or cubic boron nitride (CBN), and the tool base body can be fabricated out of steel.

In another preferred exemplary embodiment, the tool base body can incorporate an interior cooling lubricant supply system for supplying the cutting element with cooling lubricant. The coolant channels can especially preferably empty into the recesses in which the cutting elements are arranged.

Figures 2A, 2B, 2C:
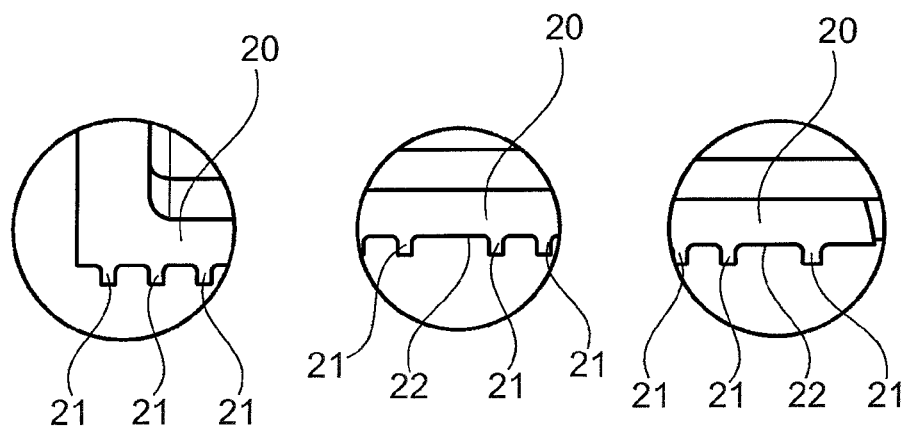
Figure 3:
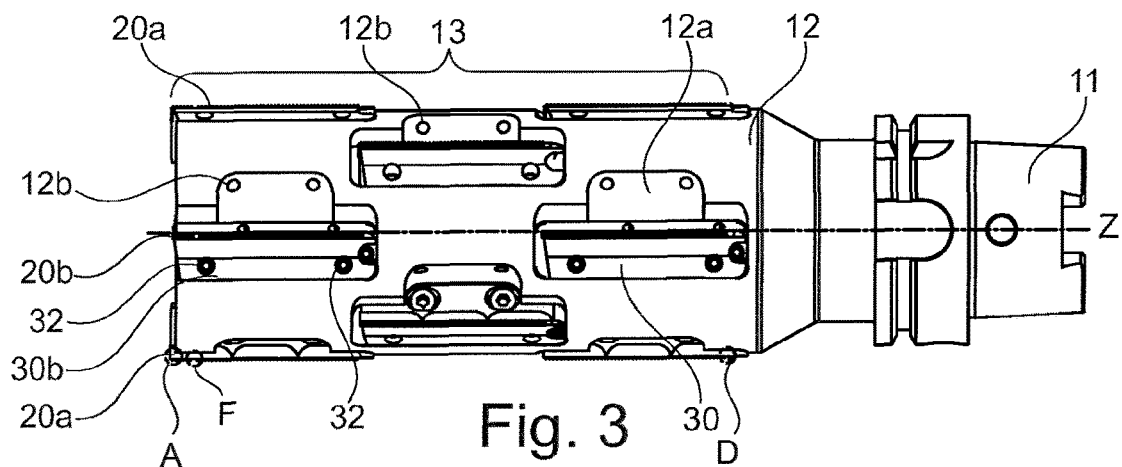
Figure 4:
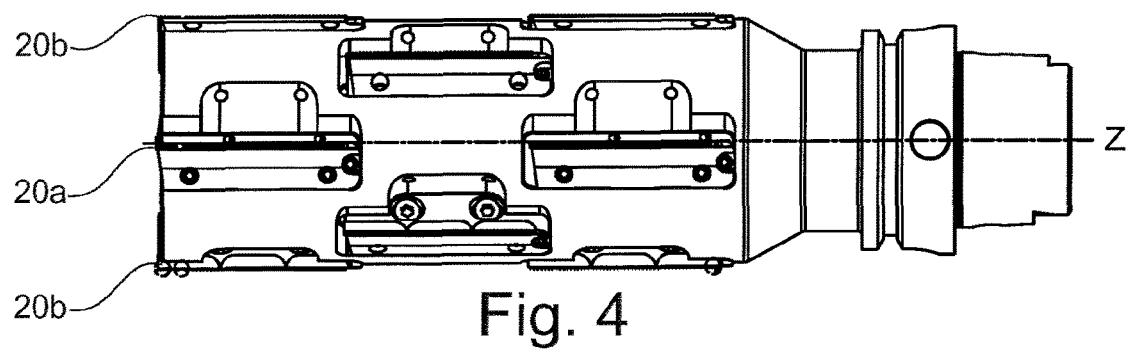
Figure 5:
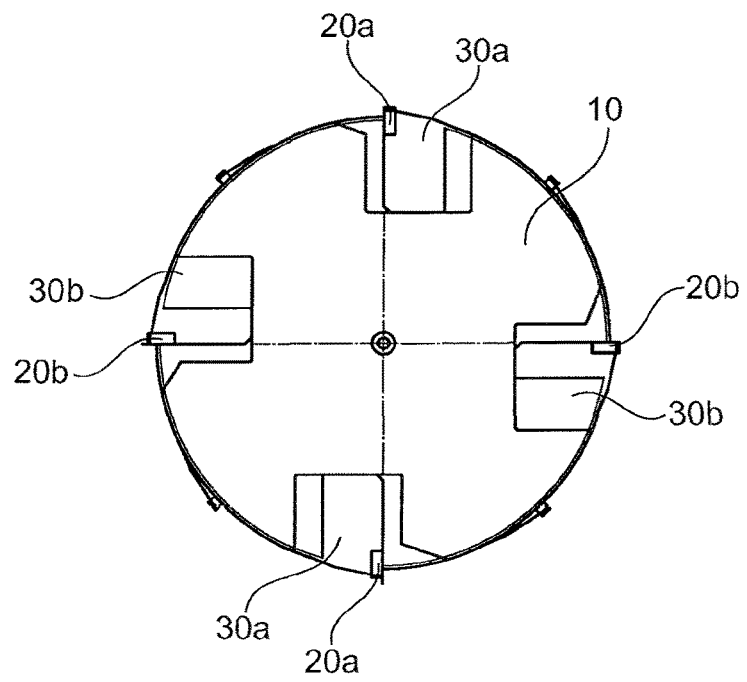

The attached drawings will be used in the following to describe a preferred embodiment of a roughing tool according to the invention. The drawings show:

FIG. 1 a perspective view of a roughing tool according to the invention;

FIG. 2a a detail A circled on FIG. 1 on a magnified scale;
FIG. 2b a detail F circled on FIG. 1 on a magnified scale;
FIG. 2c a detail D circled on FIG. 1 on a magnified scale;
FIG. 3 a side view of the roughing tool according to the invention;
FIG. 4 a side view of the roughing tool according to the invention, rotated by 90° relative to FIG. 3;
FIG. 5 a front view of the roughing tool according to the invention; and
FIGS. 6a to 6c a schematic progression of a manufacturing process according to a preferred embodiment of the invention.

In the following, FIGS. 1 to 5 will be used to provide a more detailed description of a preferred embodiment of a roughing tool 1 according to the invention that was manufactured by means of a production method according to the invention. The roughing tool 1 designed as a circular milling tool is conceived to mechanically roughen a cylindrical surface of a bore in an in particular metal workpiece, e.g., the piston running surface of a cylinder bore or a cylinder liner in an internal combustion engine by introducing into the surface a defined microstructure comprised of a plurality of continuous micro-channels arranged at an axial distance from each other, so as to obtain a good adhesive base for a surface layer to be applied in particular via thermal spraying.

For this purpose, the roughing tool 1 has a modular structure shown on the figures, which has a tool base body 10 that can be rotatably driven around a central longitudinal or rotational axis 2 and a plurality, twelve in the embodiment shown, of peripherally cutting elements or cutting strips/tools 20 staggered in the axial and/or peripheral direction.

The tool base body 10 can be functionally divided into a shank section 11 and a receiving section 12. The roughing tool 1 can be connected with a separating point or interface of a machine tool system (not shown) via the shank section 11. In the embodiment shown, the shank section 11 to this end has a hollow shaft cone (HSK) known to the expert. In the embodiment shown, in which the base body 10 has a shank section 11, the roughing tool 1 thus comprises a shank milling tool. The receiving section 12 forms an essentially circular cylindrical extension of the base body 10, and carries the plurality of cutting elements 20. The cutting elements 20 all have the same nominal length, and together with the receiving section 12 form a cutting part 13 of the roughing tool 1. The nominal diameter D of the cutting part 13 of the roughing tool 1, which has a length L, e.g., 170 mm, is smaller than the inner diameter of the bore to be machined (not shown) or cylindrical inner surface. In the embodiment shown, the roughing tool 1 thus forms a shank milling tool with a tool base body 10, which can be functionally divided into the shank section 11 and the receiving section 12, on which the cutting elements 20 are arranged.

Each cutting element 20 is comprised of a PKD (polycrystalline diamond) material, and clamped in a respective cassette 30. In particular, each cutting element 20 has a delicate toothing that corresponds to the profile of the micro-channel structure and consists of a plurality of individual cutting teeth 21 arranged at an axial distance from each other (see FIG. 2a to FIG. 2c). The multi-toothed cutting profile of each cutting element 20 determined by the cutting teeth 21 is tailored to the desired microstructure to be generated.

In the embodiment shown, the majority of the cutting teeth 21 of the cutting elements 20 is arranged at identical axial distances of approx. 80 μm, i.e., with the same axial pitch, and provided with identical, essentially rectangular tooth profiles. In the embodiment shown, the cutting teeth 21 of the cutting elements 20 each have a length of approx. 300 μm, and a height within a range of approx. 400 μm. However, this cutting profile is not mandatory, and can thus vary.

A respective larger tooth gap 22 of approx. 1600 μm is provided in the microtoothing profiles of the corresponding cutting elements 20 in proximity to the distal (remote from the shank) and proximal (close to the shank) end of the cutting part 13, in order to mark the beginning and end of the surface to be machined.

In addition, the axially spaced apart cutting teeth 21 of all cutting elements 20 are axially arranged in a row, i.e., parallel to the axis of rotation 2. The cutting elements 20 sequential in the peripheral direction have the same cutting profile. As viewed in the axial direction, the cutting elements 20 in the shown embodiment are thus arranged in quartets of identically profiled cutting elements 20 that are spaced apart at equidistant angles (90°) and sequential in the peripheral direction. In addition, the cutting teeth 21 of the respective cutting elements 20a or 20b lying diametrically opposite each other are arranged flush in the peripheral direction.

It is best that the cutting elements 20 be fixed on the tool base body 10 in a replaceable manner. To this end, the cassettes 30 for detachably retaining the cutting elements 20 are provided on the receiving section 12 of the tool base body 10. The cassettes 30 are best fixed on the tool base body 10 by fastening means 31, which in the example shown are designed as screws. Adjusting devices 32 (here adjusting screws or threaded pins) can be used to adjust the cassettes 30, and hence the cutting elements 20 retained therein, in both their axial and radial position. In the preferred embodiment shown, in each group comprised of cutting elements 20 that are sequential in the peripheral direction, the respective diametrically opposing cutting elements 20 (or 20a) are adjusted to be precisely flush, while a staggering of 500 μm was set via the cassettes 30 between the cutting elements 20a, 20b that are directly sequential in the peripheral direction, as a result of which the cutting teeth 21 of each cutting element 20 become axially positioned centrally between the cutting teeth 21 of the cutting elements 20 adjacent in the peripheral direction.

The cutting elements 20 of two axially sequentially arranged quartets are staggered as viewed in the peripheral or cutting direction (here by 45°), so that they cut into the cylindrical surface at different times.

In the embodiment shown, the roughing tool 1 further has an interior cooling lubricant supply system (not shown on the figures) for supplying the cutting elements 20 with cooling lubricant. FIG. 1 and FIG. 3 show the outlet openings 12b of the cooling lubricant supply system lying in the receiving pockets 12a, via which cooling lubricant is supplied to the cutting elements.

In the embodiment shown, the cutting part 13 of the roughing tool 1 comprised of the cutting elements 20 has a predetermined axial length, which is at least as large as the length of the cylindrical surface to be roughed. As a consequence, all grooves can be generated with a single cut. The axially adjacent cutting element groups overlap by a slight amount (here 500 μm) in an axial direction, so as to together form a gapless cutting profile over the entire cutting part 13. It could also be said that the multi-toothed cutting profiles of the axially adjacent groups of cutting elements 20 overlay/overlap viewed in the peripheral or cutting direction.

According to the invention, in order to rough a cylindrical surface, the roughing tool 1 is initially brought into position outside of the cylindrical surface to be machined in such a way that the central longitudinal or rotational axis 2 of the roughing tool 1 aligns with the bore axis. The rotating roughing tool is then moved along the bore axis up to a desired depth into the bore and then radially outward until the cutting teeth 21 cut into the cylindrical surface up to a desired radial depth. The roughing tool 1 is then moved with the radius corresponding to the desired radial depth on a 360° circular path around the bore axis. After completing a 360° circular motion, the roughing tool is again moved radially back inward and along the bore axis, out of the bore.

Therefore, the roughing tool according to the invention can be used to simultaneously cut a plurality of circularly running micro-channels into the cylindrical surface in a single machining pass, i.e., in a single 360° circular motion. The cutting profile of each cutting element determined by the cutting teeth is tailored to the desired microstructure to be generated.

Figure 6A:
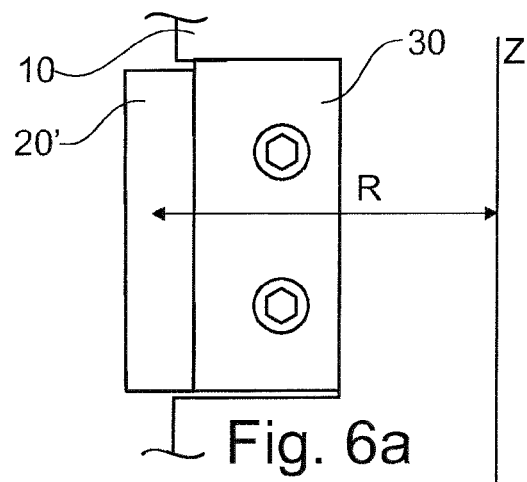
Figure 6B:
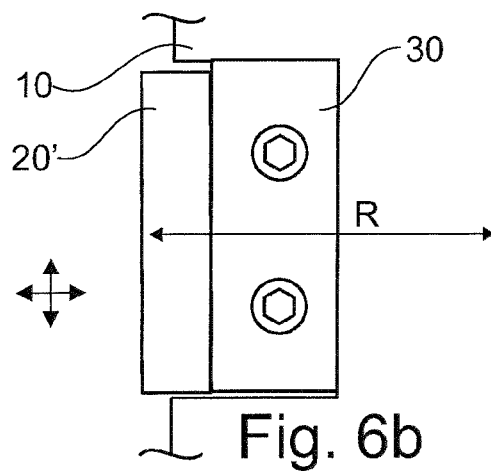
Figure 6C:
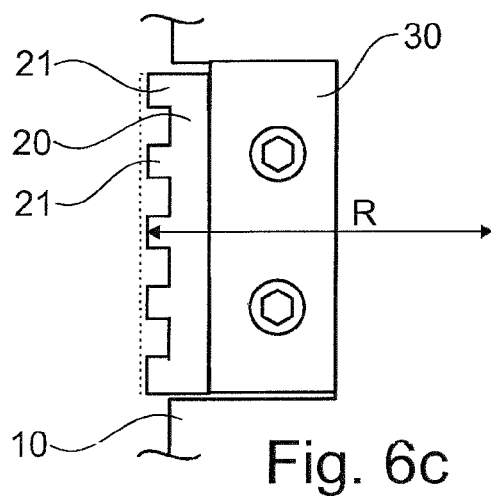

The roughing tool described in detail above and shown on FIGS. 1 to 5 is characterized in particular by the method in which it was manufactured (see FIGS. 6a to 6c). In the latter, the tool base body 10 or the cassettes 30 premounted therewith are initially fitted with cutting element blanks 20' (see FIG. 6a). A roughing tool blank is thus quasi premounted, whose cutting element blanks 20' still lack the characteristic microtoothing profile. The free edge (later cutting edge) of the cutting element blank 20' premounted in this way still deviates distinctly from the later nominal diameter (here represented by radius R). in an advantageous, yet optional manufacturing step (see FIG. 6b), the cutting element blanks 20' are preadjusted via the axial and radial adjustability of the cassettes 30, as a result of which the free edge of the cutting element blanks already lies distinctly closer to the nominal diameter R, and less material must be removed when later introducing the microtoothing, which brings with it the additional advantage of quick manufacture. In a last step (see FIG. 6c), the microtoothing or final cutting profile is introduced into the cutting element blanks 20' in a thermal machining process, more precisely via spark erosion. At the same time, each individual cutting tooth 21 is brought to the exact measure of its axial position and the nominal diameter R (desired flight circle) of the tool. The advantage to introducing the microtoothing in the premounted state is that a much higher concentricity and tracking accuracy can be achieved for the individual cutting teeth than would be possible by manually finely adjusting the cutting elements by means of the cassettes. All thermal machining methods known to the expert, for example laser beam machining, are alternatively suitable for this step.

Departing from the preferred embodiment described based on the figures, the roughing tool according to the invention can be modified as follows, for example.

In contrast to the embodiment shown, the number of cutting elements can be greater or less than twelve. The number of cutting elements can be used to tailor the length of the cutting part of the roughing tool to the length of the cylindrical surface to be roughed in a 360° circular motion.

The cutting part can be comprised of cutting elements, which are identically configured with respect to the number of cutting elements and the cutting profile of the cutting elements. Expressed differently, this means that the modified configuration of the microtoothing profile is not necessary in the area of the end of the cutting part remote from and close to the shank.

Instead of a rectangular profile, for example, the cutting teeth [can] further also have round, trapezoidal and/or dovetailed profiles or the like, as well as any combinations of the aforementioned profiles. The cutting teeth can further have [un]symmetrical and/or symmetrical cross sectional profiles or a combination thereof.

The material of the cutting elements is not limited to a PKD material, and comprises all materials commonly used for machining purposes, e.g., hard metal or the like.

In addition, the cutting elements can consist of cutting plates, cutting strips, cutting inserts or comparable cutting bodies.

In addition, the number of cutting elements spaced apart at equal angular distances, i.e., with the same angular pitch, can deviate from four.

Departing from the embodiment shown, the distance between two axially sequentially arranged cutting elements can be set in such a way that the multi-toothed cutting profiles of the axially adjacent groups of cutting elements do not overlap viewed in a peripheral or cutting direction, but rather that the microstructures generated by the cutting elements follow each other in sequence in an axially flush manner or with a defined section.

Instead of the shown HSK shank section, the roughing tool can have an SK (adjusting cone) shank section or the like. Furthermore, a shank section can be missing, and the base body then formed by the pin-like receiving section can be clamped on or in a different way.

The interior cooling lubricant supply system for supplying the cutting elements with cooling lubricant is not absolutely necessary.

REFERENCE LIST

1 Roughing tool
2 Axis of rotation
10 Tool base body
11 Shank section
12 Receiving section
12a Receiving pockets/recesses
12b Cooling lubricant outlet opening
13 Cutting part
20 Cutting element
20' Cutting element blank
30 Cassette/cutting edge carrier
31 Fastening means
32 Adjusting screw/threaded pin
R Nominal diameter

The invention claimed is:

1. A method for manufacturing a roughing tool, with the following steps:
   fitting a lateral surface of a tool base body that can be rotatably driven around an axis of rotation with at least one cutting element blank, so that a free edge of the cutting element blank protrudes out of the lateral surface in a mounted state;
   forming a microtoothing with a plurality of axially spaced cutting teeth into the free edge of the cutting element blank, and simultaneously adjusting the individual cutting teeth to a predetermined nominal diameter in a thermal machining manufacturing process, in a state pre-mounted to the tool base body.

2. The method according to claim 1, wherein while fitting the tool base body, a plurality of cutting element blanks are mounted on the tool base body staggered in an axial and/or peripheral direction, and that the microtoothing is formed in the respective free edges of the cutting element blanks in a pre-mounted state by the thermal machining manufacturing process.

3. The method according to claim 2, wherein:
   while fitting the tool base body, at least a first cutting element blank and a second cutting element blank are mounted on the lateral surface of the tool base body so as to be flush relative to each other in a peripheral direction and angularly spaced apart; and,
   while forming the microtoothing, the first and second cutting element blanks are ablatively machined in such a way that the individual cutting teeth of respective resulting cutting elements are arranged flush in the peripheral direction after machining.

4. The method according to claim 1, wherein while forming the microtoothing, each cutting tooth is fabricated as a rectangular profile defined by a prescribed length and height.

5. The method according to claim 4, wherein the prescribed length lies within a range of 200 µm to 400 µm, and the prescribed height lies within a range of 60 µm to 300 µm.

6. The method according to claim 4, wherein an axial distance between the two sequential teeth lies within a range of 100 µm to 1000 µm.

7. The method according to claim 1, wherein while fitting the tool base body with the cutting element blanks, the cutting element blanks are detachably fixed in axially and radially adjustable cassettes mounted on the tool base body, and then axially and/or radially preadjusted before forming the microtoothing.

8. The method according to claim 7, wherein after forming the microtoothing into the cutting element blanks, the cassettes are used to introduce a predetermined staggering in the axial direction, between respectively sequential cutting elements in the peripheral direction.

9. The method according to claim 1, wherein the cutting element blanks are fabricated out of PKD.

10. The method according to claim 1, wherein the roughing tool is a circular milling tool.

11. The method according to claim 2, wherein:
   While fitting the tool base body, at least a first cutting element blank and a second cutting element blank are mounted on the lateral surface of the tool base body so as to be flush relative to each other in a peripheral direction and to lie diametrically opposite each other.

\* \* \* \* \*